(12) United States Patent
Mitchell et al.

(10) Patent No.: US 9,858,064 B2
(45) Date of Patent: Jan. 2, 2018

(54) METHODS AND APPARATUS FOR VEHICLE COMPUTING SYSTEM SOFTWARE UPDATES

(75) Inventors: David Chase Mitchell, Dearborn, MI (US); Chad Evert Esselink, Canton, MI (US); Darren Peter Shelcusky, Saline, MI (US); Michael Raymond Westra, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1268 days.

(21) Appl. No.: 13/587,129

(22) Filed: Aug. 16, 2012

(65) Prior Publication Data

US 2014/0052330 A1 Feb. 20, 2014

(51) Int. Cl.
*G06F 19/00* (2011.01)
*G06F 9/445* (2006.01)

(52) U.S. Cl.
CPC .................................... *G06F 8/65* (2013.01)

(58) Field of Classification Search
CPC .................................... G06F 19/00; G06F 8/65
USPC ......................................................... 701/31.5
See application file for complete search history.

(56) References Cited

U.S. PATENT DOCUMENTS

| | | | |
|---|---|---|---|
| 5,278,759 A * | 1/1994 | Berra et al. ........................ 701/1 |
| 6,975,612 B1 * | 12/2005 | Razavi et al. ................ 370/338 |
| 7,984,190 B2 * | 7/2011 | Rhoads .......................... 709/248 |
| 2005/0090940 A1 * | 4/2005 | Pajakowski et al. ............. 701/1 |
| 2006/0142906 A1 * | 6/2006 | Brozovich et al. ............. 701/29 |
| 2007/0287439 A1 * | 12/2007 | Weyl et al. .................... 455/420 |
| 2010/0268401 A1 * | 10/2010 | Blakemore et al. .............. 701/2 |
| 2010/0273477 A1 * | 10/2010 | Namaky .................... 455/426.1 |
| 2011/0125601 A1 * | 5/2011 | Carpenter et al. ........... 705/26.1 |
| 2011/0197187 A1 | 8/2011 | Roh |
| 2011/0276218 A1 * | 11/2011 | Dwan et al. .................... 701/30 |
| 2011/0289793 A1 * | 12/2011 | Hayashi et al. ................ 34/357 |
| 2012/0030478 A1 * | 2/2012 | Dunmire et al. ............. 713/189 |
| 2012/0078453 A1 * | 3/2012 | Daum et al. .................... 701/19 |
| 2012/0124571 A1 * | 5/2012 | Nagai et al. .................. 717/173 |

* cited by examiner

*Primary Examiner* — Michael McCullough
*Assistant Examiner* — Michael E Butler
(74) *Attorney, Agent, or Firm* — Jennifer Stec; Brooks Kushman P.C.

(57) ABSTRACT

In a first illustrative embodiment, a system includes a mobile device processor configured to communicate wirelessly with both a remote server and a vehicle computing system (VCS). The processor is further configured to query the VCS for a module version, relay the module version to a remote system and receive information relating to an updated module version and module. The processor is also configured to query the VCS for vehicle battery information, inform a user of battery sufficiency for a recommended installation of the updated module, and, responsive to a user instruction to proceed with installation, instruct the VCS to download and install the updated module.

14 Claims, 7 Drawing Sheets

METHODS AND APPARATUS FOR VEHICLE COMPUTING SYSTEM SOFTWARE UPDATES

TECHNICAL FIELD

The illustrative embodiments generally relate to methods and apparatus for vehicle computing system software updates.

BACKGROUND

It is very common to have at least some form of computing processor installed in a vehicle that comes off the line in modern times. While many of these computers are limited in scope, power and purview, certain systems, such as, but not limited to, the Ford SYNC system, are designed to function as highly capable infotainment and navigation hubs, providing centralized control over a variety of vehicle features.

Of course, as with any computing system, updates to these systems are constantly ongoing. Since users don't typically make a habit of bringing a vehicle into a dealer every month or so to receive a new update (and because this could be an expensive proposition), it often falls on the shoulders of a vehicle owner to keep a computing system's software and firmware modules up to date.

Many of these systems also rely on temporary internet connections for remote communication. That is, they utilize connection services provided through a secondary device, such as a cellular phone. While certainly useful, these connection services are often limited in data provision capability. Additionally, especially when flashing a new BIOS, it can be risky to attempt such a procedure while a user is in the vehicle and the vehicle is in motion. Of course, the user is unlikely to want to sit in a garaged vehicle for twenty minutes in park to update a system, in the alternative.

These update issues have been addressed to some extent by the provision of USB or other connectivity ports in a vehicle. Users can download updates to a flash drive, then connect the drive to the USB port in order to provide the new system modules to the vehicle computing system. While this solves the connectivity issues, it can still be a mild inconvenience for users, who must remember to perform the manual updates.

Other possible update configurations have been suggested. For example, U.S. Patent App. 2008/0005733 generally discusses a computer implemented method for updating one or a combination of the system software, operating systems, device configuration, application software and firmware of electronic devices via geographically located local communication points likely to be proximate to the electronic device being updated. The communication points are connected to local servers which communicate stored update packages to the electronic device which are pre-provided by the device manufacturers, or customize update packages to the device subsequent to a query response as to the state of software, firmware, and configuration of the device to be updated.

Similarly, U.S. Patent App. 2009/0300595 generally discusses a method of remotely updating control software in a heavy-duty vehicle having at least one programmed controller including securing the heavy-duty vehicle; determining that the vehicle is secured; establishing a wireless connection with the heavy-duty vehicle; downloading an updated control software; and updating the heavy-duty vehicle's control software with the updated control software in response to the determining that the vehicle is secured.

SUMMARY

In a first illustrative embodiment, a system includes a mobile device processor configured to communicate wirelessly with both a remote server and a vehicle computing system (VCS). The processor is further configured to query the VCS for a module version, relay the module version to a remote system and receive information relating to an updated module version and module. The processor is also configured to query the VCS for vehicle battery information, inform a user of battery sufficiency for a recommended installation of the updated module, and, responsive to a user instruction to proceed with installation, instruct the VCS to download and install the updated module.

In a second illustrative embodiment, a system includes a vehicle processor configured to communicate with wirelessly over a LAN with at least one module update source. The processor is further configured to receive and respond to requests for a current module version. The processor is also configured to receive and respond to requests for a current battery power level, and responsive to received instructions to download and install a module update, lock out at least some level of vehicle functionality. Subsequent to the lockout, the processor is configured to download and install the module update from the module update source, verify the completion of the download and installation, and restart at least the module and restore functionality to the vehicle subsequent to the verification.

In a third illustrative embodiment, a computer-implemented method includes querying a VCS for a module version, using a wireless phone. The method also includes relaying the module version to a remote system and receiving information relating to an updated module. The method further includes querying the VCS for vehicle battery information. The method also includes informing a user of battery sufficiency for a recommended installation of the updated module. Also, the method includes, responsive to a user instruction to proceed with installation, instructing the VCS to download and install the updated module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
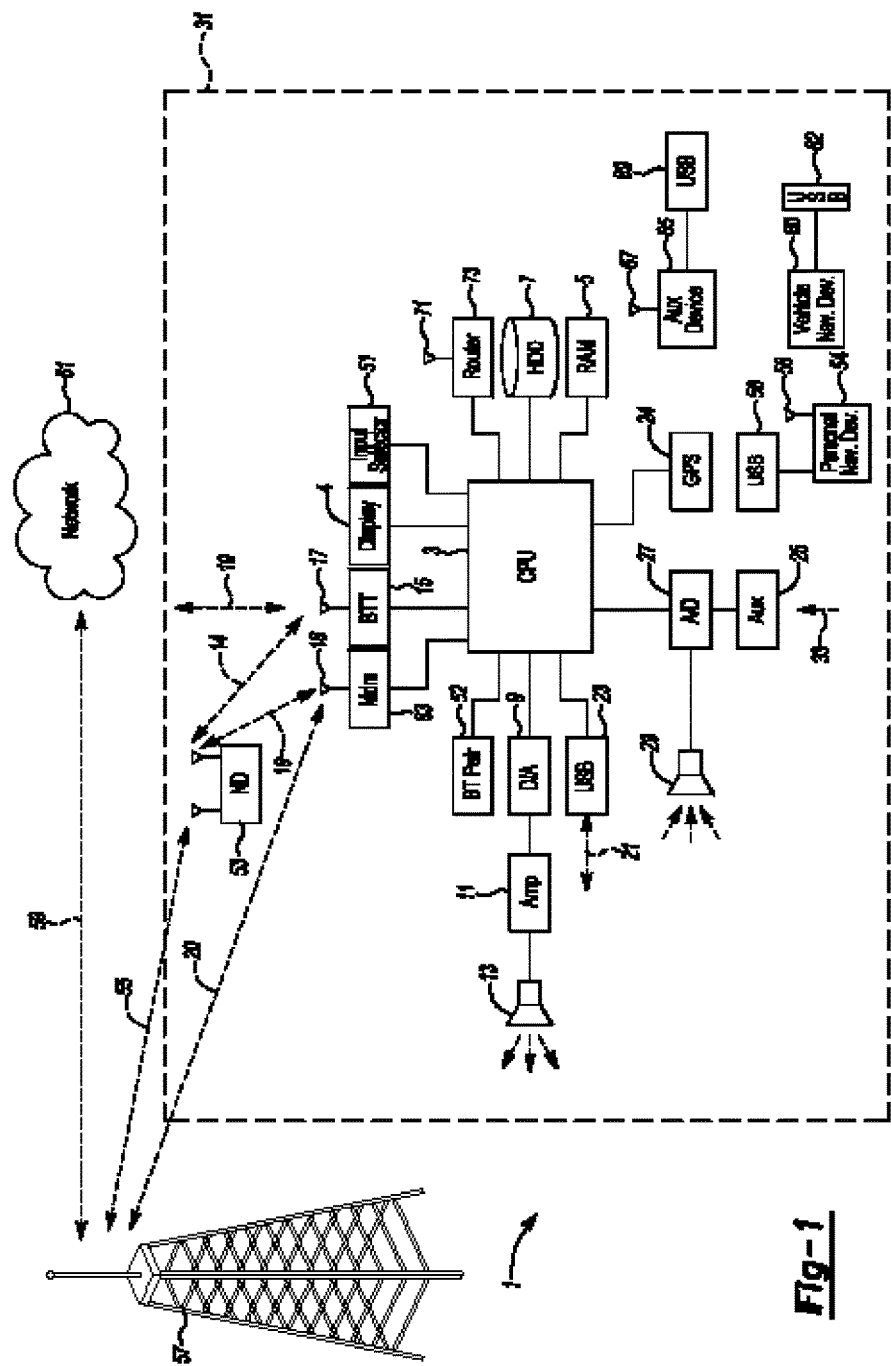
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2A:
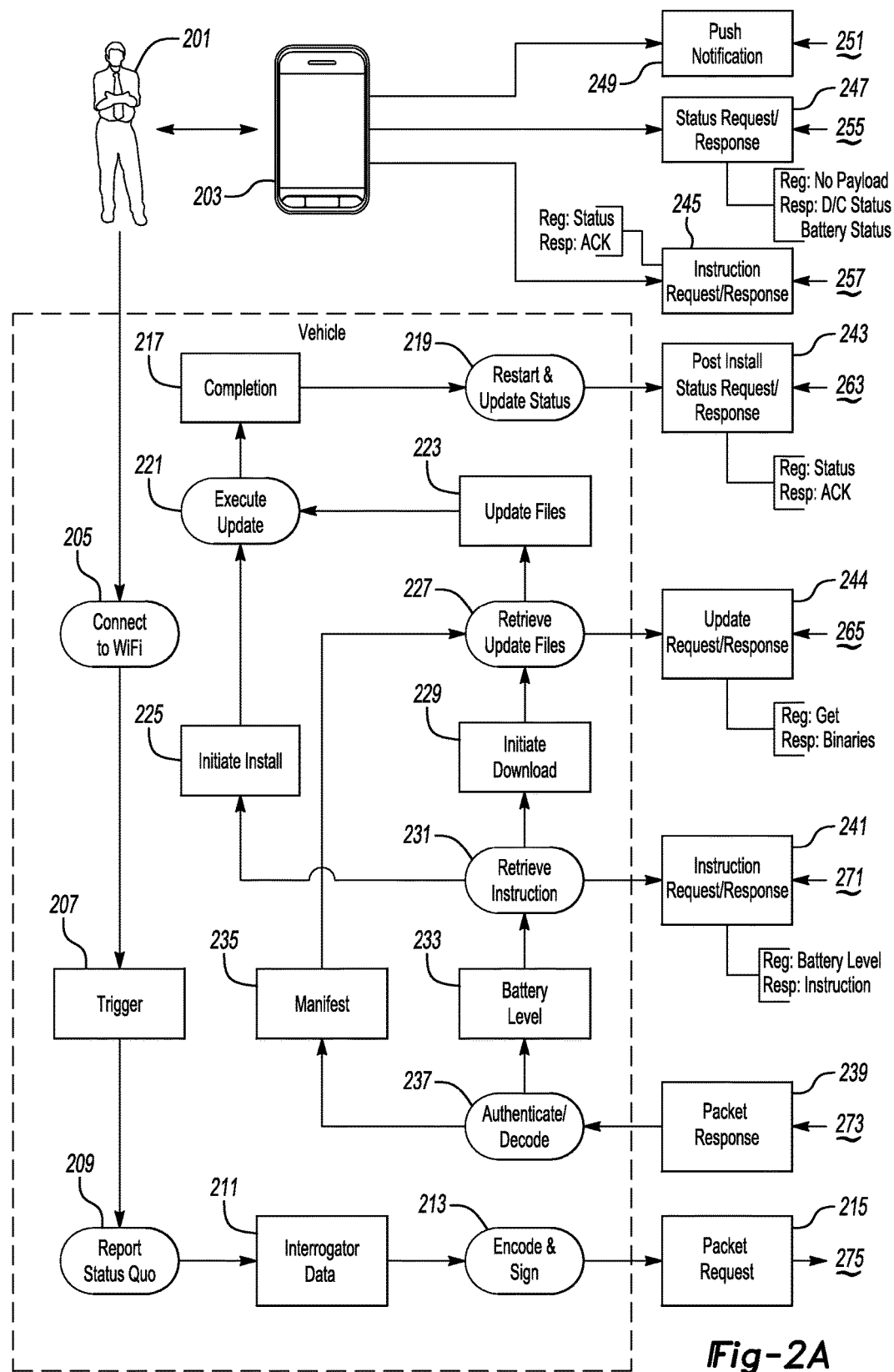
FIGS. 2A-2C show illustrative examples of a vehicle software update system.
Figure 2B:
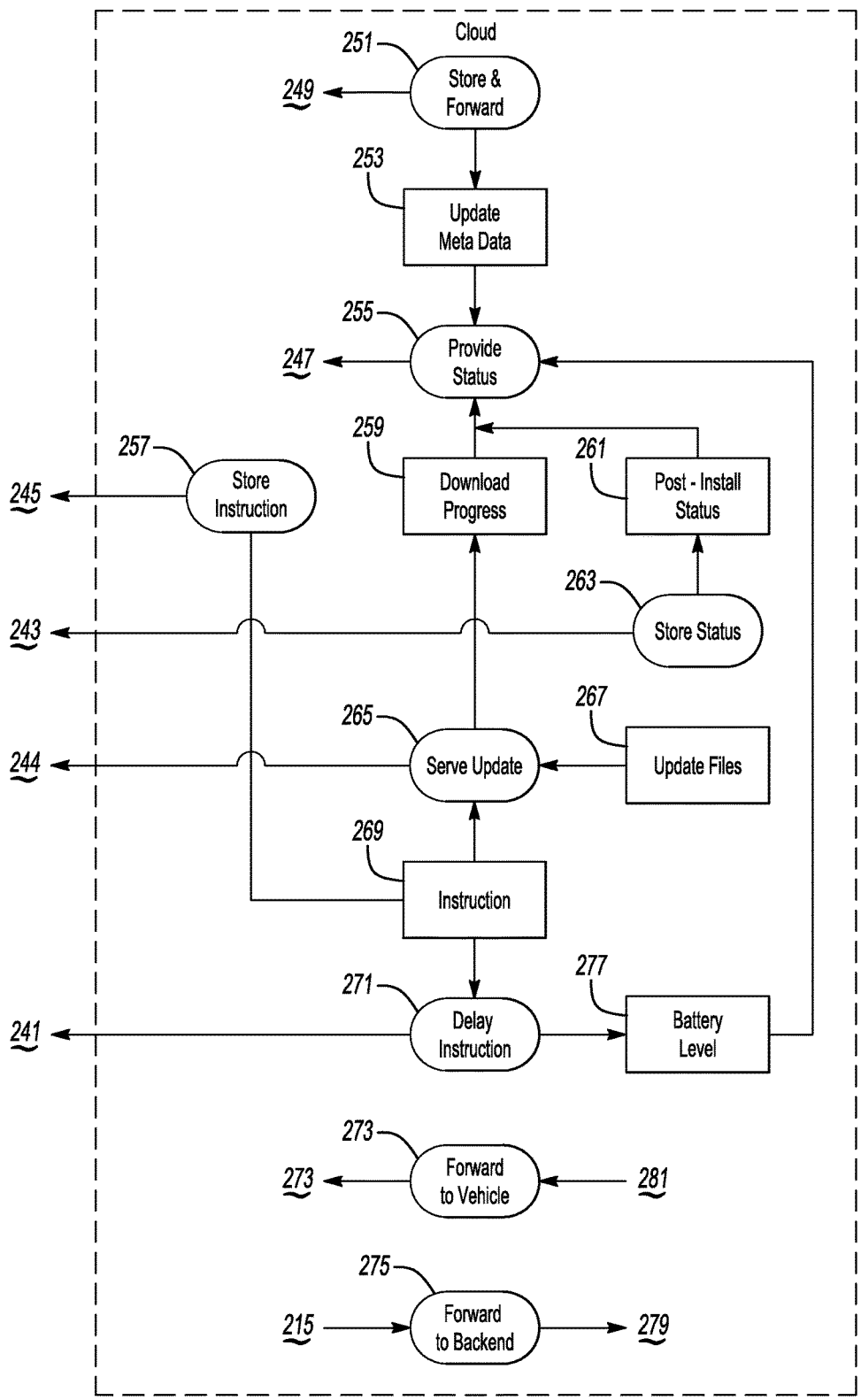
Figure 2C:
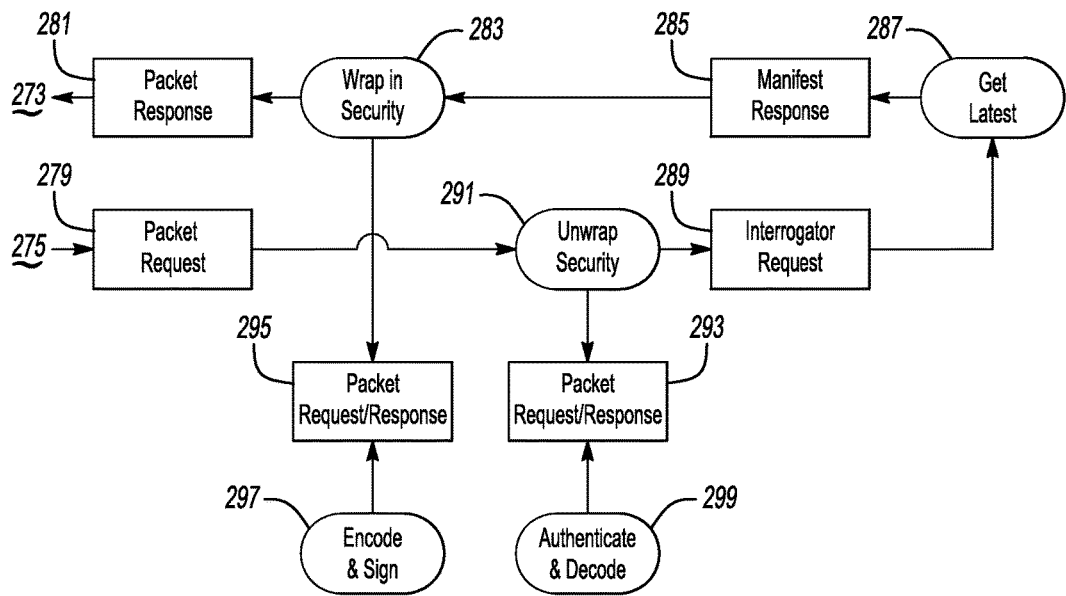

FIGS. 2A-2C show illustrative examples of a vehicle software update system. Broken into three parts for display purposes, the system represented by the three figures is one example of a complete system that can be used to update vehicle software modules.

In the illustrative embodiment shown in FIG. 2A, a user 201 and a mobile device 203 work in conjunction to instruct the initialization of a vehicle software update. At some point in time, notification of an existing module update can be pushed to the wireless device by a remote server 249. In the alternative, a user may request comparison of an existing installed version to a latest available version.

In at least one example, a vehicle itself will connect to a local WiFi router or access point 205. Once connected, a trigger 207 can be sent from the vehicle that will cause, in this example, reporting of the status of the vehicle software state(s) to a remote server 209. In conjunction with this reporting, interrogator data 211 can be included to facilitate retrieval of possible updates.

The request is encoded and signed if desired for security 213, and then sent to the cloud in one or more packets 215. Once received by the cloud (e.g., a server handling communication thereon), the request can be forwarded to an OEM backend 275. This request can then be received by the backend 279, unwrapped 291, and interrogator data 289 can be extracted therefrom.

At the same time, the packet request 293 can be authenticated and decoded 299, to determine what information is required for transmission back to a vehicle system. Once received and accessed, a get latest type routine 287 can be run to determine if any and/or all of the reported software/firmware modules are up-to-date or need replacements. A manifest of new modules can be assembled 285, and wrapped in security 283. Among other things, this security wrapping can include, but is not limited to, packetizing a request/response 295 to the interrogator and encoding and signing the request/response packet(s) 297. This securely wrapped data 281 can then be sent back to a cloud server handling communication between an OEM backend and a VCS.

Once received in the cloud, this data can then be forwarded back to a VCS 273. The securely wrapped packet response 239 can be received, over a LAN connection established with a WiFi access point (AP) and can be authenticated and decoded by a VCS 237. While the manifest of possible updates 235 is being sent to a process for actual file retrieval, the system can, at the same time, examine a battery level of the vehicle 233 to determine if sufficient power remains for the projected update to complete.

In response to the manifest receipt, the process in the vehicle can begin to retrieve update files intended for installation 227. In this example, however, before this request begins processing, the battery level 223 is considered and an instruction whether or not to begin installation is received 231. A request is sent out 241, including a battery level and expecting an instruction on proceeding (or proceeding recommendation) in response. Instructions can be provided by a cloud process 269, and relayed 271 both to the vehicle system and to a status update function 255 for provision to a mobile device 203. The mobile device relay can include a battery level 277 and download/battery status 255. Also included in this response to the device can be any relayed data on possible updates 251, such as update metadata 253.

If an instruction to act at a later time is stored in the cloud 257, this instruction can, at some point, be sent again to both the vehicle through the relay process 271 and to a mobile device as an acknowledgement of a status request 257.

Once an instruction to download data has been received and confirmed 231, the process can send a command to initiate a download of data 229 and begin to retrieve files associated with the manifest 235. Another instruction to initiate an installation of files (once download is complete) 225 can be sent to an update process 221. Once updated files 223 are obtained, through, for example, updated files 267 served out 265 to the local vehicle in one or more packets 244, the process can instruct execution of the update 221.

While the update is ongoing, the cloud process can track and serve 255 download progress 259 out as one or more status updates 245 to the connected mobile device 203.

Upon completion of the installation process 217, the vehicle can restart 219, update a status for a remote server 243, and possibly, if needed, shift a mode into one which allows a vehicle to be driven again. In at least one embodiment, a vehicle shifts into an accessory mode while installation is occurring, preventing vehicle usage, turn-off, etc., so as not to result in a corrupted file during installation.

Vehicle post-installation status can be stored 263 as data 261 on the cloud and provided 247 as a status update 255 to a mobile device 203, notifying a user when installation and restart of the vehicle is completed.

Although relatively complex, this example is intended to provide exemplary insight into how multiple remote systems can work in conjunction with a vehicle to provide wireless updating of vehicle modules with little user-interaction required. It may also be possible to automatically provide these updates, without specifically requiring any user interaction, if certain conditions are met, but the user interaction might be desirable due to the fact that the update process could render a vehicle unusable for some period of time while the updating is occurring.

Figure 3A:
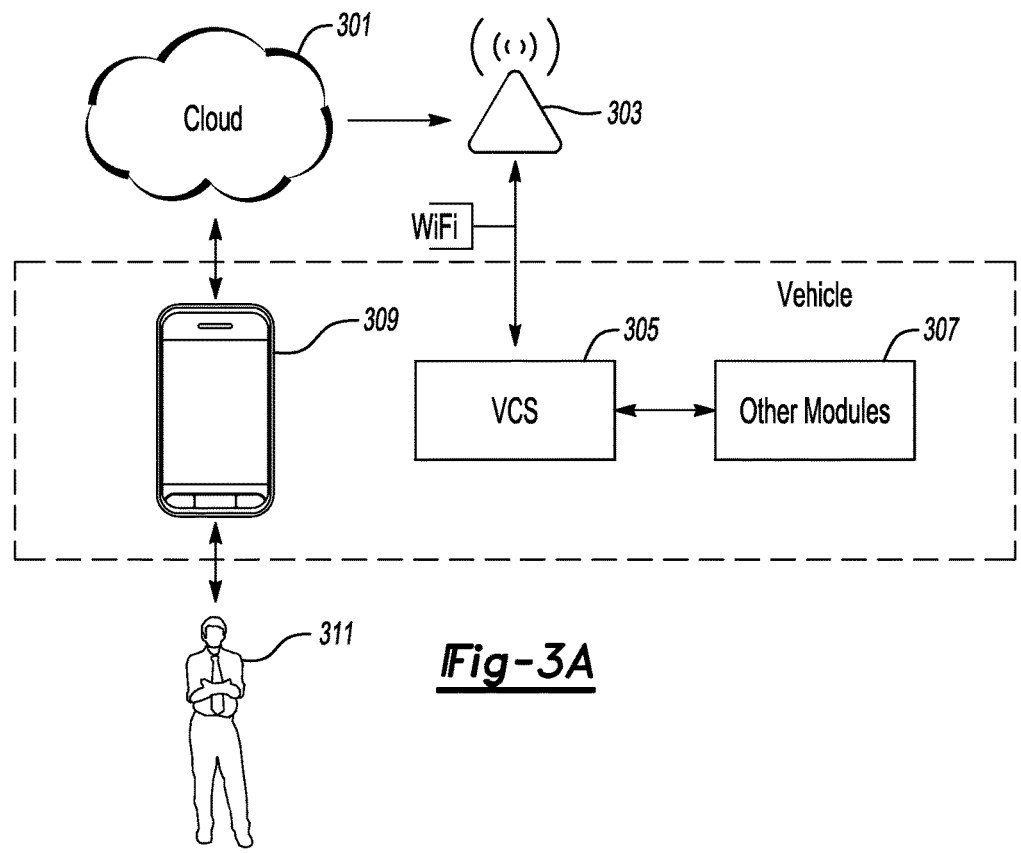
FIGS. 3A and 3B show examples of illustrative communication setups for system updates.
Figure 3B:
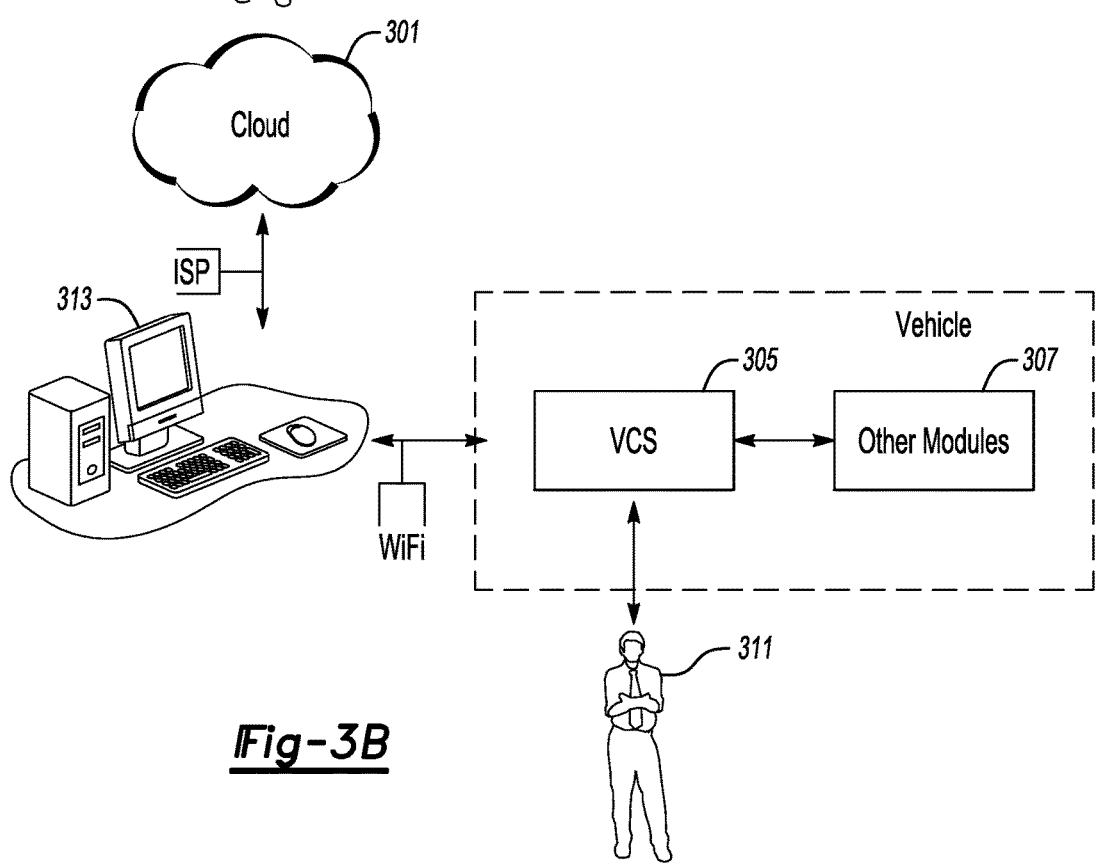

FIGS. 3A and 3B show examples of illustrative communication setups for system updates. In this illustrative example, the cloud 301 again serves as an intermediary between a user 311, the user's mobile device 309 and a VCS 305. The cloud (which can include the remote OEM server, if one chooses to use the term in that fashion), communicates with the VCS through a router 303 over a WiFi or other suitable wireless medium.

At the same time, control of and updates relating to the status of the upgrade process can be handled through the wireless device 309. In this model, software updates to the VCS and other connected modules 307 are downloaded directly to the VCS 305. This can be beneficial because it only requires a single instance of downloading, but, on the other hand, the download must occur while the VCS is powered (and thus the vehicle is likely also powered). Interruptions in the power of the vehicle can interrupt the download and require further download at a future time. Wireless service interruptions (e.g., provider-related interruptions) can also interrupt a download and impair a user's ability to obtain module updates.

In the model shown in FIG. 3B, a local PC 313 is utilized as an intermediary to download the information from the cloud 301. Since PCs are often connected for significantly longer periods of time than a VCS may be, the PC can download the software at any appropriate time, and stage the software for uploading to the VCS. Although this requires two transfers of the software (once to the PC and once to the VCS from the PC), the second transfer is not from the cloud and thus is not subjected to, for example, interruptions in an ISP's service provision.

Instead, in this example, a user can use a PC which had downloaded any updated software (possibly, for example, after checking with a wirelessly connected VCS for needed updates) to instruct uploading and installation of software updates to a VCS 305 and other modules 307. Or, a user, upon parking a car and connecting to a home network, can be informed that one or more updates is available.

The owner, upon seeing this, can see status related information regarding the update displayed on the VCS 305, and can elect to leave a vehicle powered and unused for the requisite amount of time to complete the upload and installation process.

Figure 4:
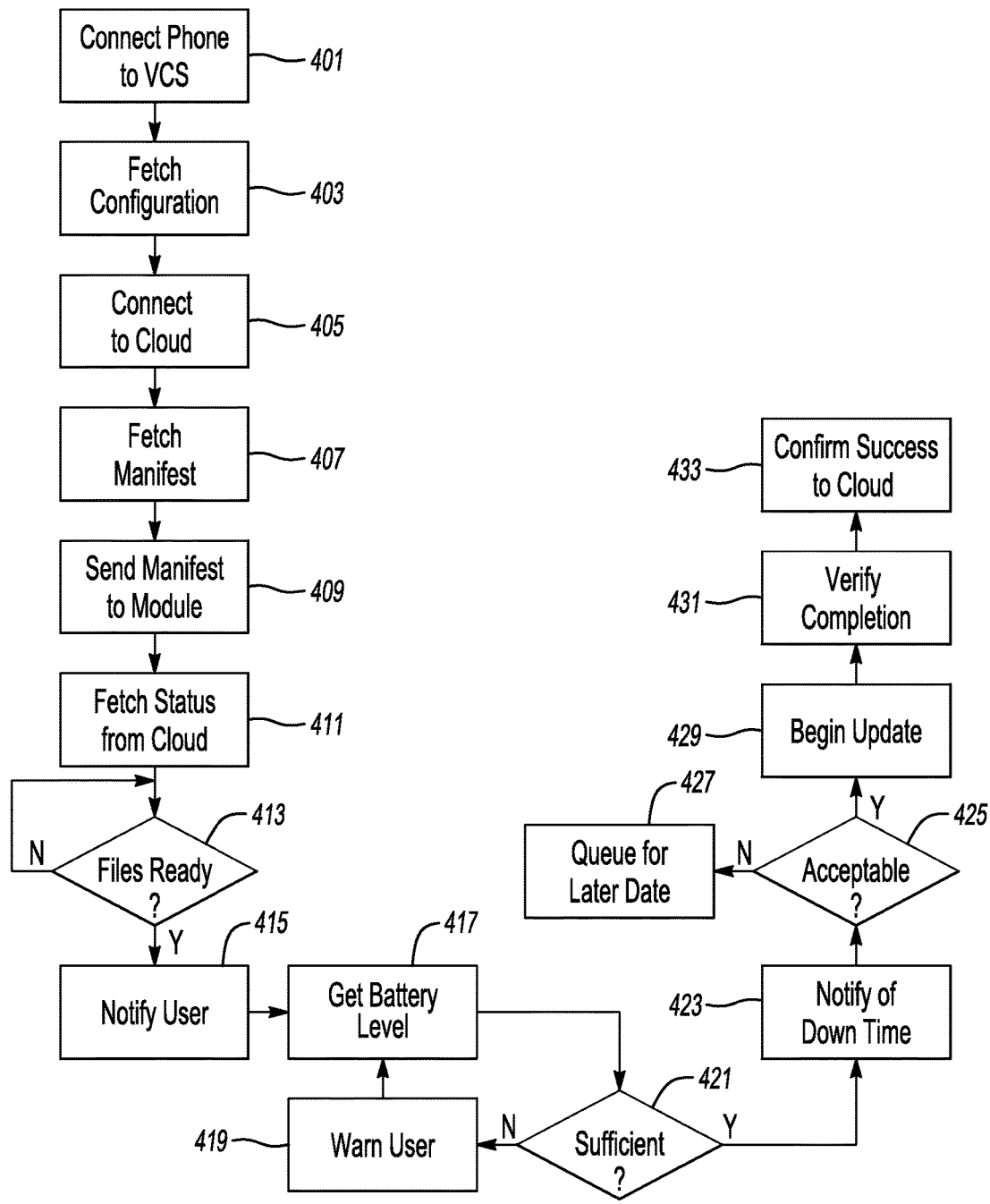
FIG. 4 shows an illustrative example of a software update process.

FIG. 4 shows an illustrative example of a software update process. In this illustrative example, the configuration shown in FIG. 3A is utilized to complete the download and update process. First, a user's phone connects to a vehicle computing system 401. This allows communication of current software module version information to occur between the phone and the cloud, and can provide a visual record (on a phone app, for example) of current and available modules.

A current vehicle configuration is fetched from the vehicle 403 by the phone application, and a connection to the cloud is established 405. The connection to the cloud allows transmission of a current configuration obtained from the vehicle, and obtainment of a manifest of available module updates 407. The manifest can then be sent to the appropriate module in the vehicle 409, which can work with a phone and WiFi connection to fetch the availability of file status from the cloud 411.

At this point, in this example, very little "heavy lifting" has been done by the phone data connection. Mostly it has served as an information relay and presentation device, but the information has largely related to status information. If the files are ready and/or available for download 413, the process can notify the user (via the phone, for example) 415 and then check the available battery power in the vehicle 417.

As previously noted, it may be desirable to leave a vehicle powered long enough to download the entire update in one sitting, and subsequently also install the update in the same session. In order to ensure this is possible, a vehicle battery life may need to be know, to ensure that sufficient power remains to keep the vehicle powered during the entire process. If sufficient battery power does not exist 421, the process may notify a user 419 that there is insufficient battery power to complete a download and/or update process. The user can be given instructions to increase the battery power, and if followed, sufficient power may then exist to proceed.

Once there is sufficient battery power to complete the process, the system may notify the user of any expected down-time. Since, in this example, the user cannot use the vehicle while the update is installing, the process may wish to let the user know that the vehicle is unable to be used during this time. If the delay is acceptable 425, the process may begin downloading and installing the appropriate updates 429. Status of the updates can be tracked over the phone, which, in this example, has been used to control all data communication and confirmation processes.

Once the update has completed and has been verified 431, the process can update both a cloud record of the new software 433, and can provide the user phone with some notification that the process has completed. If the user finds the projected unavailability of the vehicle to be unacceptable, the process can simply wait until a later time to attempt to complete the download/installation 427.

Figure 5:
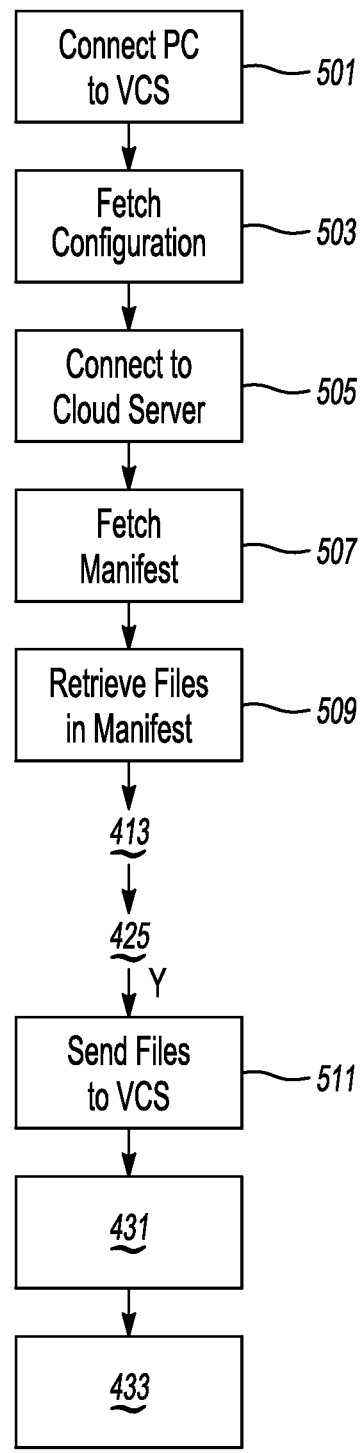
FIG. 5 shows a second illustrative example of a software update process.

FIG. 5 shows a second illustrative example of a software update process. In this illustrative example, a PC is used as an intermediary between the VCS and the cloud based system(s). This model follows the example shown in with respect to FIG. 3B.

In this example, the process first connects a PC to the VCS 501. This connection can be established, for example, over a LAN WiFi connection provided by a home router or other AP. By connecting to the VCS, the PC can fetch a configuration of the current versions of modules 503. Once this data is had, even if the vehicle subsequently goes offline, the next few steps can proceed without vehicle interaction, and thus can work whether the vehicle is present/powered or neither.

Using the obtained version information, the process can connect to the cloud 505 and fetch a manifest of possible updated 507, similar to the procedure performed by the phone application. In this case, however, the files recommended in the manifest will be retrieved by the PC itself 509, allowing for local storage and queuing of these files. Again, this download process can occur without interaction with the vehicle if desired.

Once the appropriate files have been downloaded and verified, the process, if the time is appropriate, can then connect (or remain connected) to the vehicle and begin to send the files to the vehicle 511. This file transfer period and the subsequent update period may again require that the vehicle be left powered and unused, and so the time at which this occurs may be user designated. Accordingly, all of the power and acceptability checks 413-425 may occur between the time the files are downloaded to the home PC and the time the files are uploaded and installed 511 in the VCS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a mobile device processor configured to:
   query a vehicle computing system (VCS) for a module version;
   relay the module version to a remote system;
   receive information relating to an updated module version;
   query the VCS for vehicle battery charge-level;
   inform a user of sufficient charge-level for a recommended updated module version installation; and
   responsive to a user instruction to proceed with installation, instruct the VCS to download and install the updated module.

2. The system of claim 1, wherein the information relating to the updated module version includes an estimated download and installation time for the updated module.

3. The system of claim 2, wherein the processor is configured to compare the estimated download and installation time to the battery information to determine the battery sufficiency for the recommended installation.

4. The system of claim 3, wherein the processor is configured to provide one or more instructions relating to steps to increase remaining battery power, if remaining battery power is insufficient to complete the installation.

5. The system of claim 1, wherein the processor is further configured to query the VCS to determine if the VCS is currently wirelessly connected to a LAN, and wherein the processor is further configured to inform a user of a VCS LAN connection status.

6. The system of claim 1, wherein the processor is further configured to receive one or more status updates during the download and installation process and to relay the status updates to a user.

7. The system of claim 1, wherein the processor is further configured to receive a verification and completion update upon completion of download, installation and verification of an updated status of the updated module and to relay the verification and completion update to the user.

8. A computer-implemented method comprising:
   querying a vehicle computing system (VCS) for a module version, using a wireless phone;
   relaying the module version to a remote system;
   receiving information relating to an updated module;
   querying the VCS for vehicle battery charge-level;
   determining, by a computer, that the charge-level is sufficient for a recommended updated module installation; and
   responsive to a user instruction to proceed with installation, instructing the VCS to download and install the updated module.

9. The method of claim 8, wherein the information relating to the updated module includes an estimated download and installation time for the updated module.

10. The method of claim 9, further including comparing the estimated download and installation time to the battery information to determine the battery sufficiency for the recommended installation.

11. The method of claim 10, further comprising providing one or more instructions relating to steps to increase remaining battery power, if remaining battery power is insufficient to complete the installation.

12. The method of claim 8, further comprising querying the VCS to determine if the VCS is currently wirelessly connected to a LAN; and informing a user of a VCS LAN connection status.

13. The method of claim 8, further comprising receiving one or more status updates during the download and installation process and relaying the status updates to a user.

14. The method of claim 8, further comprising receiving a verification and completion update upon completion of download, installation and verification of an updated status of the updated module and relaying the verification and completion update to the user.

* * * * *